(12) United States Patent
Wang et al.

(10) Patent No.: US 11,513,810 B1
(45) Date of Patent: Nov. 29, 2022

(54) INFORMATION HANDLING SYSTEM WITH DISPLAY DEVICE INTERFACE SUPPORTING DYNAMIC CONFIGURATION OF LINK DATA RATE

(71) Applicant: Dell Products L.P., Round Rock, TX (US)

(72) Inventors: Chung-Wei Wang, Taipei (TW);
Chih-Chung Lin, New Taipei (TW);
You-Liang Chen, New Taipei (TW);
Pei-Yu Wang, Hsinchu (TW)

(73) Assignee: Dell Products L.P., Round Rock, TX (US)

( * ) Notice: Subject to any disclaimer, the term of this patent is extended or adjusted under 35 U.S.C. 154(b) by 1 day.

(21) Appl. No.: 17/376,447

(22) Filed: Jul. 15, 2021

(51) Int. Cl.
| | |
|---|---|
| *G06F 9/4401* | (2018.01) |
| *G06F 1/3234* | (2019.01) |
| *G09G 5/00* | (2006.01) |
| *H04N 7/015* | (2006.01) |

(52) U.S. Cl.
CPC .......... *G06F 9/4411* (2013.01); *G06F 1/3265* (2013.01); *G09G 5/006* (2013.01); *H04N 7/015* (2013.01); *G09G 2330/023* (2013.01); *G09G 2330/026* (2013.01); *G09G 2370/04* (2013.01)

(58) Field of Classification Search
CPC ..................................................... G06F 1/3265
See application file for complete search history.

(56) References Cited

U.S. PATENT DOCUMENTS

2017/0365229 A1* 12/2017 Kwa .................. G09G 5/003

* cited by examiner

*Primary Examiner* — Gustavo Polo
(74) *Attorney, Agent, or Firm* — Jackson Walker L.L.P.

(57) ABSTRACT

A method of configuring a display device interface (DDI) detects a trigger signal, generated by a display device. If the trigger signal is associated with a power on event, a full configuration of the DDI is performed, including loading display device capability information provided by the display device into DDI configuration registers and setting one or more DDI configuration parameters accordingly. If the trigger signal is associated with resume event, rather than a power on event, a modified fast link resume operation may be performed to route the trigger signal to a controller configured to explicitly write display device capability information to the appropriate DDI configuration registers before setting the corresponding DDI configuration parameter accordingly. The DDI may include a re-timer, between the DDI source and sink, configured to snoop the explicit write transaction such that the re-timer configuration is also updated.

20 Claims, 4 Drawing Sheets

INFORMATION HANDLING SYSTEM WITH DISPLAY DEVICE INTERFACE SUPPORTING DYNAMIC CONFIGURATION OF LINK DATA RATE

TECHNICAL FIELD

The present disclosure relates to information handling system display devices and, more specifically, the configuration of display device interfaces for embedded displays.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Many information handling systems, including desktop, laptop, and notebook computer systems, include a display device for displaying video content, still images, computer generated graphics, and so forth. In such systems, a display device interface (DDI) coordinates the communication of pixel data from a video information source on the host system to a video information sink such as the display device. One pervasive DDI referenced herein is the DisplayPort family of DDI standards. DDIs may encompass physical and electrical characteristics of the host-display transport as well as protocols for formatting and communicating pixel data. DDIs are generally able to support different configurations. As one of numerous possible examples, a DDI may support two or more maximum data transfer rates. Accordingly, it is important to ensure that the DDI source and the DDI sink recognize compatible configurations. In addition, because display devices consume significant power when active, display devices are routinely put to sleep or powered down and must be fully or partially re-configured when restored. Accordingly, DDIs typically perform a significant number of configuration operations, which may include numerous register read/write operations and potentially timing consuming link training operations.

In a platform, such as a notebook computer, that includes an embedded display, it may be reasonable to anticipate comparatively fewer display device reconfigurations because the display device does not generally change. Accordingly, DDI developers may wish to implement streamlined protocols for embedded applications. As an example, the DisplayPort family of DDI standards includes a companion standard, appropriately referred to as embedded DisplayPort (eDP), intended for embedded-display platforms. An example of protocol streamlining supported in eDP is a feature referred to as fast link training. Fast link training permits platform firmware corresponding to the DDI source port to assume that the DDI configuration is static during any given power interval. Under this assumption, eDP fast link training permits the source port to re-use specified configuration settings, rather than mandating a full configuration of the transport based on display device capabilities received from the DDI sink port. While fast link training may potentially improve performance when a sleeping display device transitions from a sleep state, it may be necessary or desirable to supplement fast link functionality to include explicit configuration updates.

SUMMARY

In accordance with subject matter disclosed in the following description, a disclosed method for configuring a DDI may detect a trigger signal generated by a display device. If the trigger signal is associated with a power on event, a full configuration of the DDI is performed, including loading display device capability information provided by the display device into DDI configuration registers and setting one or more DDI configuration parameters accordingly. If the trigger signal is associated with resume event, rather than a power on event, a modified fast link resume operation may be performed to route the trigger signal to a controller configured to explicitly write display device capability information to the appropriate DDI configuration registers before setting the corresponding DDI configuration parameter. The DDI may include a re-timer, between the DDI source and sink, configured to snoop the explicit write transaction such that the re-timer configuration is also updated.

The display device interface configuration parameter(s) may include a link data rate parameter indicative of a maximum rate of transferring data via the DDI. The display device may be an embedded display device and the DDI may comprise an embedded DisplayPort (eBD) interface, including a unidirectional eDP main link for transporting video data from source to sin, a bidirectional eDP aux channel over which the source may discover capabilities of the sink, and a hot plug detect (HPD) signal generated by the display device to signal either a power on event or a resume event. The embedded display device may be a ultra-high definition (UHD) display device requiring a high bit rate (HBR) transport including, as a non-limiting example, an HBR3 transport with an 8.1 Gbps link rate. The controller and the re-timer device may both be coupled to a system management bus and the controller may perform the explicit write transaction as a system management bus transaction.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
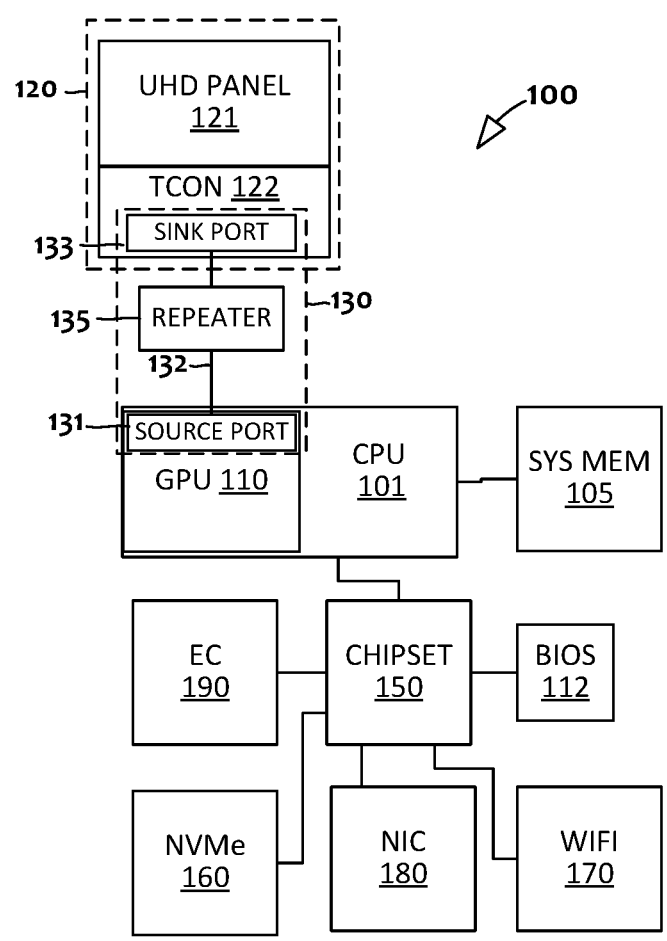
FIG. 1 illustrates an information handling system.

Exemplary embodiments and their advantages are best understood by reference to FIGS. 1-4, wherein like numbers are used to indicate like and corresponding parts unless expressly indicated otherwise.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU"), microcontroller, or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

Additionally, an information handling system may include firmware for controlling and/or communicating with, for example, hard drives, network circuitry, memory devices, I/O devices, and other peripheral devices. For example, the hypervisor and/or other components may comprise firmware. As used in this disclosure, firmware includes software embedded in an information handling system component used to perform predefined tasks. Firmware is commonly stored in non-volatile memory, or memory that does not lose stored data upon the loss of power. In certain embodiments, firmware associated with an information handling system component is stored in non-volatile memory that is accessible to one or more information handling system components. In the same or alternative embodiments, firmware associated with an information handling system component is stored in non-volatile memory that is dedicated to and comprises part of that component.

For the sake of brevity, the word "platform" may be used in this description in lieu of the term "information handling system."

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

For the purposes of this disclosure, information handling resources may broadly refer to any component system, device or apparatus of an information handling system, including without limitation processors, service processors, basic input/output systems (BIOSs), buses, memories, I/O devices and/or interfaces, storage resources, network interfaces, motherboards, and/or any other components and/or elements of an information handling system.

In the following description, details are set forth by way of example to facilitate discussion of the disclosed subject matter. It should be apparent to a person of ordinary skill in the field, however, that the disclosed embodiments are exemplary and not exhaustive of all possible embodiments.

Throughout this disclosure, a hyphenated form of a reference numeral refers to a specific instance of an element and the un-hyphenated form of the reference numeral refers to the element generically. Thus, for example, "device 12-1" refers to an instance of a device class, which may be referred to collectively as "devices 12" and any one of which may be referred to generically as "a device 12".

As used herein, when two or more elements are referred to as "coupled" to one another, such term indicates that such two or more elements are in electronic communication, mechanical communication, including thermal and fluidic communication, thermal, communication or mechanical communication, as applicable, whether connected indirectly or directly, with or without intervening elements.

Referring now to FIG. 1, an information handling system 100, also referred to herein simply as platform 100, in accordance with disclosed subject matter is illustrated.

As depicted in FIG. 1, platform 100 includes a central processing unit (CPU) 101 with an integrated graphics processing unit (GPU) 110 and a system memory 105. CPU 101 is further coupled to a chipset 150, which provides interconnects for various peripheral devices and expansion busses including, in the illustrated embodiment, a nonvolatile storage resource identified as nonvolatile memory express (NVMe) 160, A Wi-Fi radio/antenna/adapter 170, a network interface card (NIC) 180, an embedded controller 190, and a flash memory resource identified as BIOS 112.

The platform 100 depicted in FIG. 1 further includes an embedded display device 120, including a UHD display panel 121 attached to a timing controller (TCON) 122. The embedded display device 120 of FIG. 1 connects to and communicates with a video source device over DDI 130. As depicted in FIG. 1, GPU 110 is the video source for embedded display device 120. The DDI 130 illustrated in FIG. 1 includes a transport 132 between a source port 131 integrated within GPU 130 and a sink port 133 integrated within TCON 122.

The DDI 130 employed in the depicted platform may be an embedded-specific or embedded-optimized interface. In at least one embodiment, DDI 130 is compliant with eDP version 1.4a (eDP1.4a) or later. The eDP 1.4a standard defines a main link comprising four unidirectional data lanes, each of which must comply with an 8.1 Gbps transfer rate standard referred to as high bit rate version 3 (HBR3). To ensure adequate signal integrity at display device 120 for HBR3 and beyond, the illustrated DDI 130 incorporates a signal repeater 135 connected between source port 131 and sink port 133. Repeaters suitable for use in the illustrated DDI 130 include, as non-limiting examples, a PS8463E re-timer and a PS8461E mux/re-timer from Parade Technologies. Other embodiments may employ re-timers from a different vendor, a limiting or linear re-driver, or another suitable type of repeater.

Although FIG. 1 illustrates platform 100 with a particular combination and configuration of components and devices, other embodiments may incorporate numerous variations that will be readily recognized by those of ordinary skill in the field of microprocessor based system design. As an example, although FIG. 1 illustrates a CPU 101 with an integrated GPU 110, other embodiments may feature a GPU 110 that is not integrated within CPU 101. As another example, although the DDI source port 131 illustrated in FIG. 1 is integrated within GPU 11, the DDI source may be integrated within chipset 150 or may be part of a distinct display controller device in other embodiments.

Figure 2:
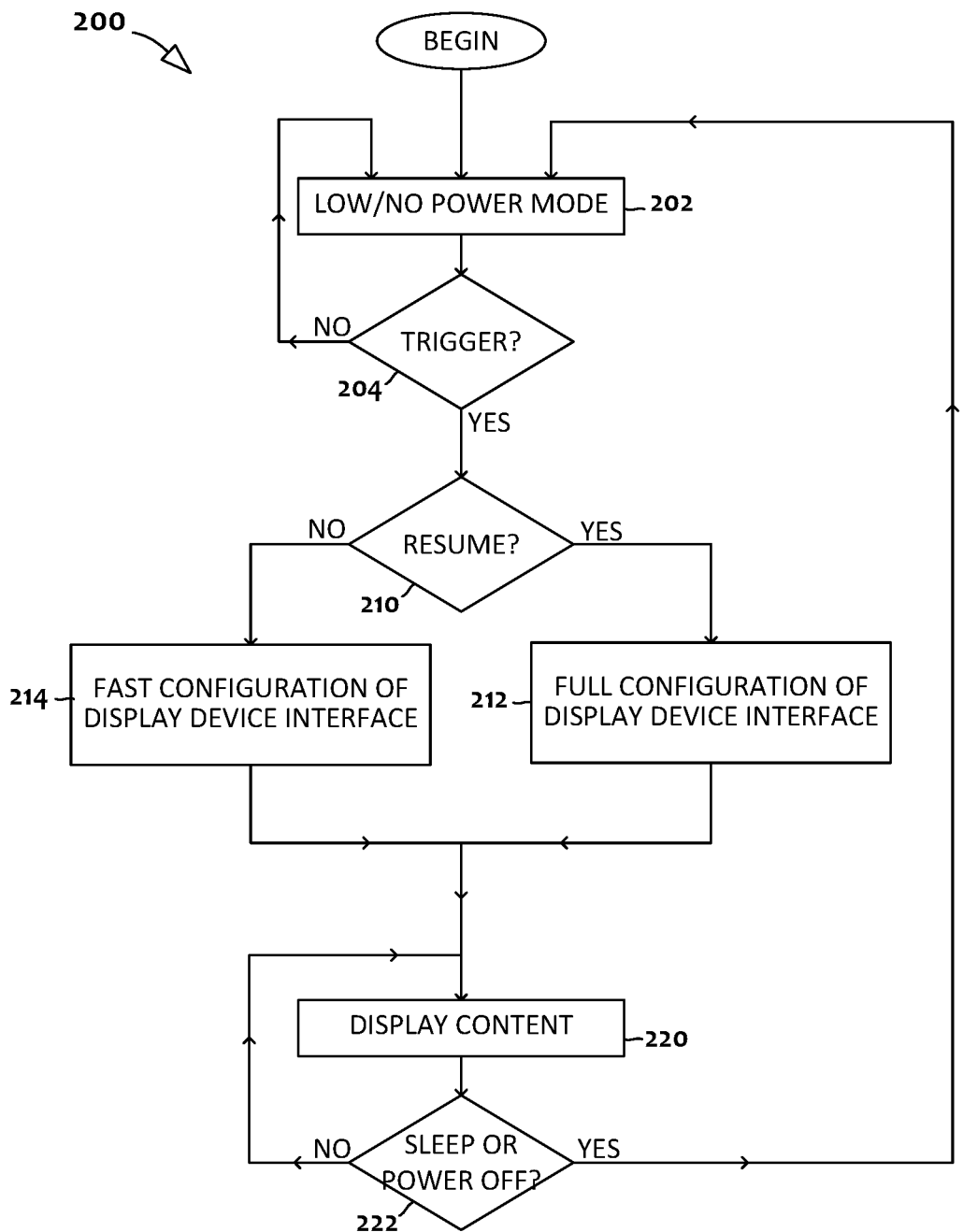
FIG. 2 illustrates a method for configuring an embedded display device interface.

As suggested in the preceding description, platform 110 may employ a DDI 130 supporting one or more embedded-specific features including, as a non-limiting example, a fast link configuration feature. The flow diagram of FIG. 2 illustrates a conventional fast link configuration method 200. The illustrated fast link configuration method 200 begins with the display device in a low or no power state (block 202) including, for purposes of illustration, the S3 power state in a Microsoft Windows environment. The display device remains in the low/no power state until a trigger signal is generated (block 204) in response to an event and the trigger signal indicates the display device is transitioning from the low/no power state to a working state such as the S0 state in a Microsoft Windows environment. Upon detecting the trigger signal at block 204, the illustrated method 200 determines (block 210) what type of event resulted in the trigger signal. In at least some embodiments, the platform distinguishes between two event types, namely, a power on event and a resume power event. As suggested by its name, a power on event may occur when the device is in a powered off state and a power switch, button, or other form of actuator is pressed, engaged, or otherwise asserted. A resume power event may refer to any event that transitions the display device from a standby mode to a working mode. Examples may include a keyboard click, mouse click, mouse movement, a wake on LAN (WOL) event, etc. In at least some embodiments, a duration of the trigger signal may distinguish between power on events and resume power events. Other embodiments may distinguish between event types based on other criteria.

If the trigger signal detected in block 204 is associated with a power on event, the method 200 illustrated in FIG. 2 performs (block 212) a full configuration of the DDI. For purposes of this disclosure, a full configuration includes a determination of one or more of the sink device's capabilities including the data transfer rates, also known as link rates, supported by the sink device. In eBD-compliant embodiments, the source device may learn the sink device's supported link rates by reading from one or more specifically designated DisplayPort Configuration Data (DPCD) registers. After determining the applicable capabilities of the sink device, the full configuration operation of block 212 may then access a different DPCD register to set the source device's link rate.

If the platform determines in block 210 that the trigger signal is associated with a resume power event, the illustrated method 200 may perform (block 214) a fast configuration of the DDI. In at least some implementations, the fast configuration in block 214 may omit a determination of the sink device's capabilities before setting the link rate.

Following the applicable DDI configuration, method 200 may proceeds to a working state during which the platform may display (block 220) content corresponding to video data received through DDI 130 and the platform may remain in this state until the display device is powered off or put to sleep following an explicit interrupt or based on a timeout condition wherein no video content has been delivered to the sink for some specified duration.

Unfortunately, the fast configuration of block 214 may result in an improperly configured DDI that fails to display video content properly. As an example, if the DDI includes a re-timer or another type of repeater device, such as the repeater 135 illustrated in FIG. 1, repeater 135 may monitor or "snoop" configuration transactions executed by the one or both of the interface endpoints to determine settings required for the configuration of the repeater itself. If the applicable embedded-optimized DDI standard does not mandate a determination of the sink's capabilities following a resume power event, there may be no configuration transaction for the repeater to snoop and this can result in a repeater configuration that is incompatible with the configuration of one or both endpoints.

Figure 3:
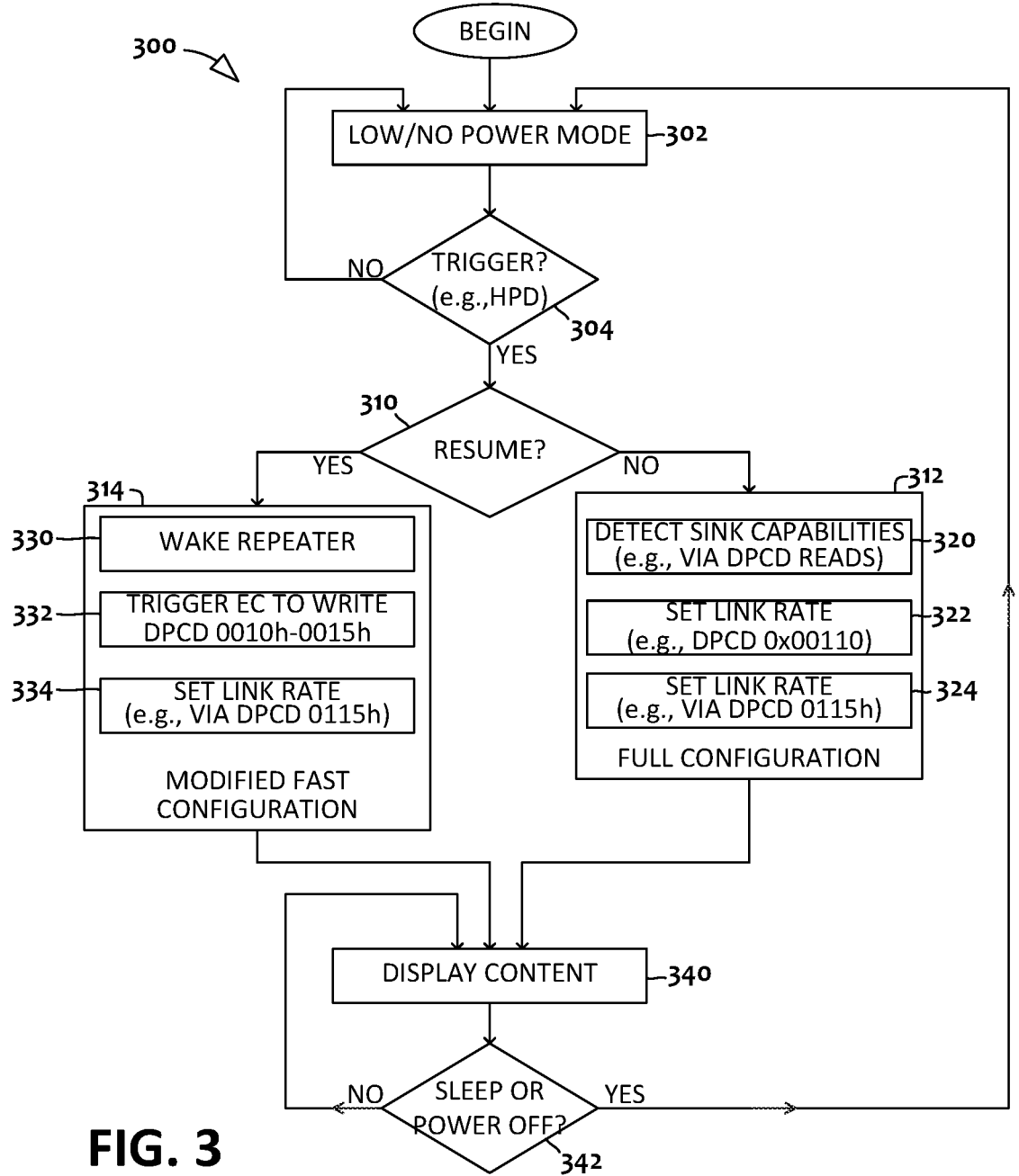
FIG. 3 illustrates a second method for configuration an embedded display device interface.

Referring now to FIG. 3, a flow diagram for a DDI configuration method referred to herein as modified fast configuration method 300 is illustrated. The illustrated method 300 begins, like method 200 of FIG. 2 begins, with the embedded display device in a low or no power state at block 302, where the display device remains until a trigger signal indicating (block 304) that the display device power state is transiting to a working state, e.g., a Microsoft Windows S0 state. In at least one eDP-based embodiment of method 300, the HPD signal generated by each eDP-compliant embedded display device is leveraged for use as the trigger signal. Method 300 may then determine (block 310) whether the trigger signal indicates a resume power event or a power on event. Again, as discussed above regarding FIG. 2, platform 100 may, in eDP-compatible implementations, recognize two different types of HPD triggers including a short HPD trigger corresponding to a resume power event and a long HPD trigger corresponding to a power on event.

If the platform determines that the trigger signal detected in box 304 corresponds to a power on signal, the illustrated performs a full configuration (block 312). The full configuration illustrated in FIG. 3 includes detecting (block 320) sink device capabilities, setting (block 322) the link rate and configuring (block 324) the repeater in accordance with the sink capabilities detected in block 322. The detecting of sink device capabilities in block 322 may include reading certain predetermined DPCD registers. In at least some implementations, the DPCD registers read during operation 320 include DPCD registers 0x00010 through 0x0001F.

If the trigger detected in block 304 corresponds to a resume power event, the illustrated method 300 performs modified fast link operations 314. The modified fast link operations illustrated in FIG. 3 include waking (block 330) repeater 135. In an embodiment illustrated in FIG. 4 and described in more detail below, the HPD signal, which is routed to repeater 135, is used to wake up repeater 135. The HPD signal is also routed to an embedded controller, which is coupled to repeater 135. In at least one embodiment, the embedded controller and the repeater are both connected to a system management (SM) bus and, in response to the HPD signal being asserted, the embedded control is configured to write (block 332) values into the repeater's link rate DPCD registers, e.g., at 0x0010 through 0x001F. After the repeater's DPCD registers have been written, the link rate may be set (block 334).

Following the configuration of the repeater through either the full configuration operations 312 or the modified fast link operations 314, the illustrated method 300 displays available content (block 340) until the display device is powered off or goes to sleep (block 342), at which point, method 300 returns to the low/no power state of block 302.

Figure 4:
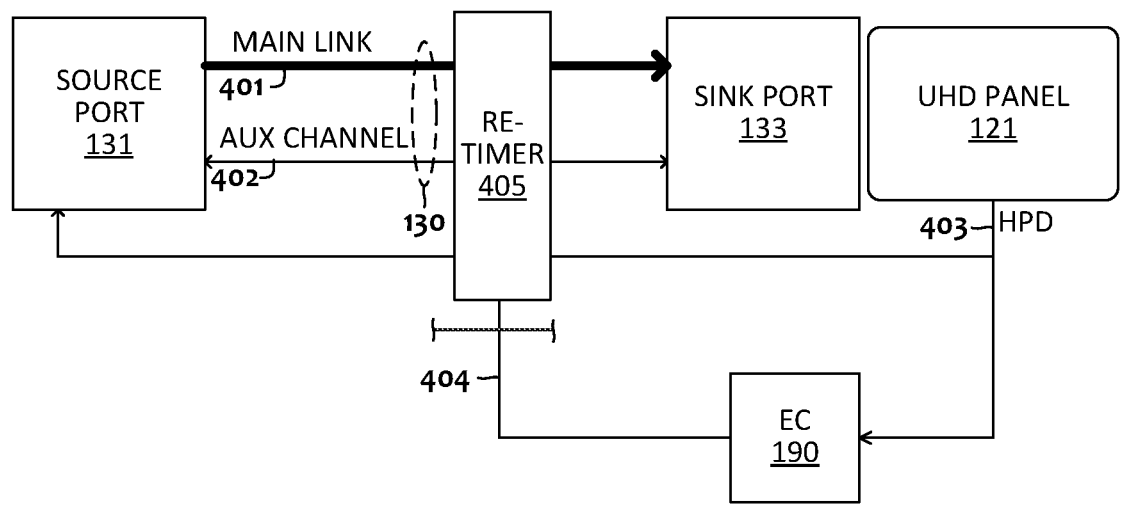
FIG. 4 illustrates information handling system detail suitable for carrying out the method of FIG. 3.

FIG. 4 illustrates an eDP-based example configuration for carrying out the method 300 illustrated in FIG. 3. As depicted, the DDI 130 includes a unidirectional main link 401 and a bidirectional auxiliary channel 402 extending from source port 131 to sink port 133. The repeater 135 of FIG. 1 has been implemented, in FIG. 4, with a re-timer 405. Re-timers may provide wider bandwidth and better quality than a re-driver or another type of repeater. The HDP signal 403 generated by UHD panel 121 and delivered to source port 131 is also routed to embedded controller 190. A bus 404, to which embedded controller 190 and re-timer 405 are both connected, enables embedded controller 190 to write data into configuration registers, e.g., DPCD registers, of re-timer 405. In at least one embodiment, bus 404 is implemented as an SM bus or another type of I2C bus.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

What is claimed is:

1. A method of configuring a display device interface, wherein the method comprises:
    detecting a trigger signal, generated by a display device of an information handling system, wherein the trigger signal is indicative of a power state transition of the display device from a low-power state to a working state;
    responsive to detecting the trigger signal, determining whether the trigger signal is associated with a power on of the display device;
    responsive to determining the trigger signal is associated with a power on transition, performing a new configuration of the display device interface, wherein the new configuration includes:
        loading display device capability information provided by the display device into display device interface configuration registers; and
        setting at least one display device interface configuration parameter in accordance with the display device configuration registers; and
    responsive to determining the trigger signal is not associated with a power on of the display device, performing a modified fast link resume, wherein the modified fast link resume includes:
        routing the trigger signal to a controller configured to respond to the trigger signal by writing display device capability information to the one or more display device interface configuration registers; and
        setting the at least one display device interface configuration parameter.

2. The method of claim 1, wherein the at least one display device interface configuration parameter includes a link data rate parameter.

3. The method of claim 1, wherein the display device comprises an embedded display device of the information handling system and wherein the display device interface comprises an embedded DisplayPort (eBD) interface comprising a main link and an aux link.

4. The method of claim 3, wherein the embedded display device comprises a ultra-high definition (UHD) display device.

5. The method of claim 3, wherein the display device interface includes a re-timer device configured to snoop the aux link.

6. The method of claim 5, wherein the controller and the re-timer device are both coupled to a system management bus and wherein the controller writes the display device capability information via a system management bus transaction.

7. The method of claim 3, wherein the trigger signal comprises a hot plug detection (HPD) signal generated by the display device.

8. An information handling system, comprising:
    a central processing unit (CPU);
    a graphics processing unit coupled to the CPU and configured to generate pixel data for a display device;
    a display device coupled to a display device interface;
    a display device interface source to transmit video data corresponding to the pixel data to the display device via the display device interface, wherein the display device interface source is configured to perform display device interface configuration operations including:
        detecting a trigger signal, generated by a display device of an information handling system, wherein the trigger signal is indicative of a power state transition of the display device from a low-power state to a working state;
        responsive to detecting the trigger signal, determining whether the trigger signal is associated with a power on of the display device;
        responsive to determining the trigger signal is associated with a power on transition, performing a new configuration of the display device interface, wherein the new configuration includes:
            loading display device capability information provided by the display device into display device interface configuration registers; and
            setting at least one display device interface configuration parameter in accordance with the display device configuration registers;
        responsive to determining the trigger signal is not associated with a power on of the display device, performing a modified fast link resume, wherein the modified fast link resume includes:

routing the trigger signal to a controller configured to respond to the trigger signal by writing display device capability information to the one or more display device interface configuration registers; and setting the at least one display device interface configuration parameter.

9. The information handling system of claim 8, wherein the at least one display device interface configuration parameter includes a link data rate parameter.

10. The information handling system of claim 8, wherein the display device comprises an embedded display device of the information handling system and wherein the display device interface comprises an embedded DisplayPort (eBD) interface comprising a main link and an aux link.

11. The information handling system of claim 10, wherein the embedded display device comprises a ultra-high definition (UHD) display device.

12. The information handling system of claim 10, wherein the display device interface includes a re-timer device configured to snoop the aux link.

13. The information handling system of claim 12, wherein the controller and the re-timer device are both coupled to a system management bus and wherein the controller writes the display device capability information via a system management bus transaction.

14. The information handling system of claim 10, wherein the trigger signal comprises a hot plug detection (HPD) signal generated by the display device.

15. A non-transitory computer readable medium including process executable instructions that, when executed by a processor of an information handling, cause the information handling system to perform display device configuration operations comprising:

detecting a trigger signal, generated by a display device of an information handling system, wherein the trigger signal is indicative of a power state transition of the display device from a low-power state to a working state;

responsive to detecting the trigger signal, determining whether the trigger signal is associated with a power on of the display device;

responsive to determining the trigger signal is associated with a power on transition, performing a new configuration of the display device interface, wherein the new configuration includes:

loading display device capability information provided by the display device into display device interface configuration registers; and setting at least one display device interface configuration parameter in accordance with the display device configuration registers;

responsive to determining the trigger signal is not associated with a power on of the display device, performing a modified fast link resume, wherein the modified fast link resume includes:

routing the trigger signal to a controller configured to respond to the trigger signal by writing display device capability information to the one or more display device interface configuration registers; and setting the at least one display device interface configuration parameter.

16. The non-transitory computer readable medium of claim 15, wherein the at least one display device interface configuration parameter includes a link data rate parameter.

17. The non-transitory computer readable medium of claim 15, wherein the display device comprises an embedded display device of the information handling system and wherein the display device interface comprises an embedded DisplayPort (eBD) interface comprising a main link and an aux link.

18. The non-transitory computer readable medium of claim 17, wherein the embedded display device comprises a ultra-high definition (UHD) display device.

19. The non-transitory computer readable medium of claim 17, wherein the display device interface includes a re-timer device configured to snoop the aux link.

20. The non-transitory computer readable medium of claim 19, wherein the controller and the re-timer device are both coupled to a system management bus and wherein the controller writes the display device capability information via a system management bus transaction.

* * * * *